Dec. 14, 1926.

J. SMITH 1,610,626

SODA FOUNTAIN

Filed August 13, 1925    2 Sheets-Sheet 1

INVENTOR.
Joseph Smith
BY
Erwin, Wheeler & Woolard
ATTORNEYS.

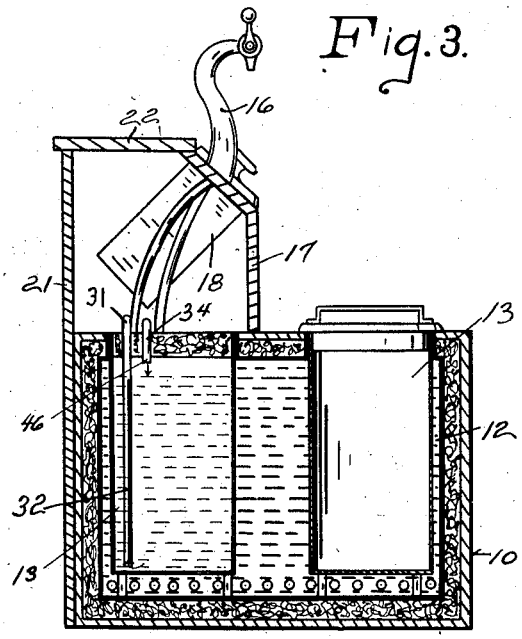
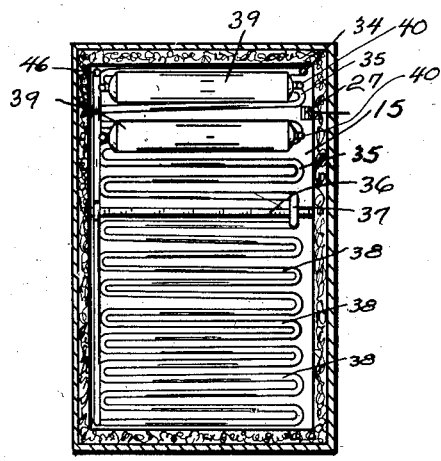
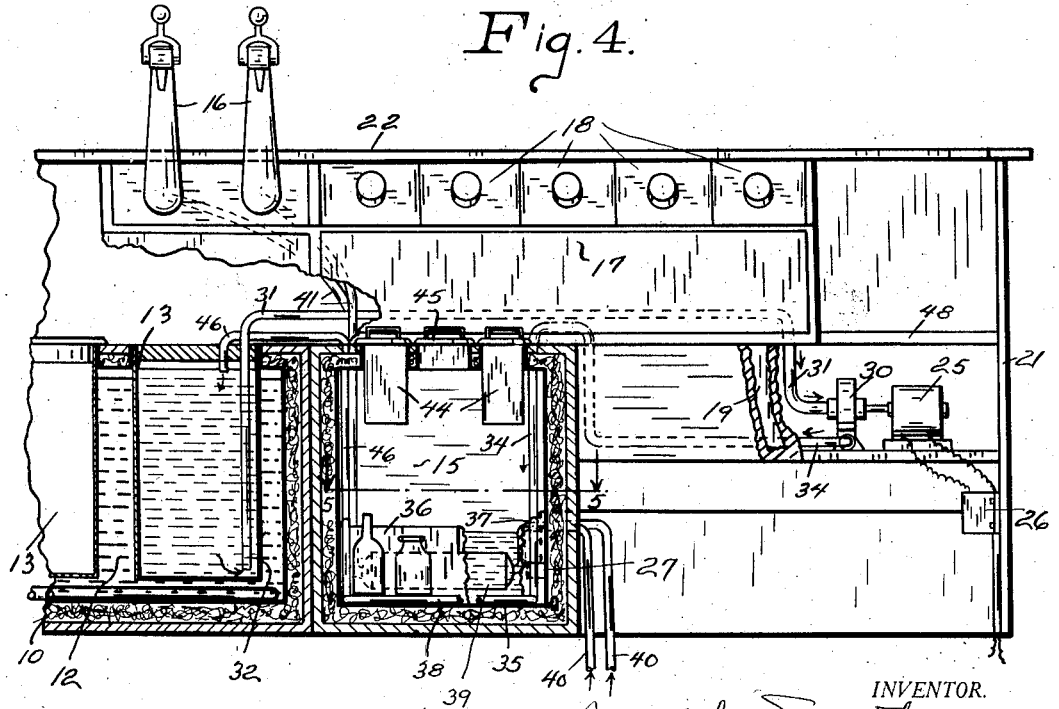

Patented Dec. 14, 1926.

1,610,626

UNITED STATES PATENT OFFICE.

JOSEPH SMITH, OF MILWAUKEE, WISCONSIN.

SODA FOUNTAIN.

Application filed August 13, 1925. Serial No. 49,971.

This invention relates to improvements in soda fountains.

It is the object of the invention to provide means for refrigerating an entire soda fountain installation in simple, inexpensive and convenient manner by using, without mechanical alteration, a refrigerating unit primarily intended and heretofore used solely for keeping ice cream and the like.

Soda fountain installations vary so widely in their requirements that it has become the practice among the manufactures of refrigerating units to make up such units merely for the storage of ice cream and the like which is kept in large cans of uniform size, and for which the unit may readily be constructed. Such standard units have been installed in large numbers throughout the country, and by reason of their rectangular form they may readily be fitted into any desired type of soda fountain. The proprietors of a soda fountain containing such a unit, however, have heretofore usually resorted to the use of ice and salt for the purpose of refrigerating milk, syrups, soda water, and the like, which must be kept cold but which are not cared for by the standard refrigerating mechanisms used for keeping ice cream.

It will be understood that such a standard refrigerating unit for ice cream is a comparatively expensive machine, and that it is only by standardization that its cost can be kept low enough to make it a commerically successful device. The amount of refrigeration required for fruit syrups, milk, soda water and the like, is comparatively so small that it does not warrant the expenditure which would be required if every refrigerating unit were made a special rather than a standardized job. The portions of the soda fountain, however, which receive the syrups, carbonized water, and other articles which require this limited degree of refrigeration are usually constructed to suit the requirements of a given installation, and it is the primary purpose of the present invention to provide simple means in which these special parts of the fountain may be so constructed as to partake of the refrigeration afforded by a standard unit associated therewith and without in any way requiring the mechanical modification of such a unit.

In the drawings:

Figure 3 is an enlarged detail section taken on the line indicated at 3—3 in Figure 1.

Figure 4 is an enlarged detail on the same scale as Figure 3, taken longitudinally through the fountain installation and looking toward the front thereof.

Figure 5 is a view taken on the section indicated at 5—5 in Figure 4.

Like parts are identified by the same reference characters throughout the several views.

Figure 1:
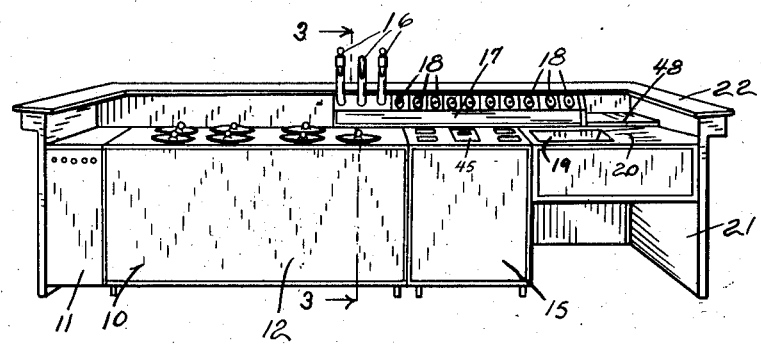
Figure 1 is a perspective view of the rear of a soda fountain embodying this invention.

A commercial refrigerating unit such as has been referred to above is shown at 10 and comprises a housing 11 for the electrically operable refrigerating machinery and a primary chamber or vat 12 which is preferably filled with brine or its equivalent into which extend the receptacles 13, in which ices, ice cream, and the like are stored. While such units have been referred to as standardized, it will be understood that they are made in various sizes according to the capacity desired for ice cream storage. The standardization consists primarily in the omission from all such iceless cabinets of means for refrigerating anything but ices or ice cream. The particular cabinet shown is known as an eight hole device, there being eight of the receptacles 13 into which ice cream or its equivalent may be lowered for refrigeration.

In association with the standardized iceless cabinet, designated in its entirety by reference character 10, I have shown the refrigerator chest 15, faucets 16 for carbonized and other water, and a housing 17 for the several jars 18 in which fruit syrups and the like are carried. A sink 19 and drainboard 20 complete the fountain, which is enclosed by a wall 21 and a counter 22 in the usual manner.

Figure 2:
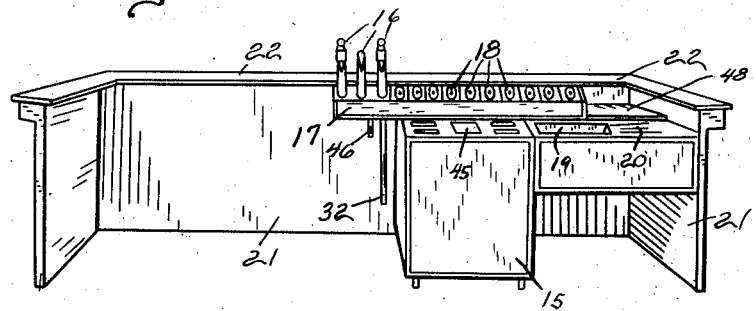
Figure 2 is a view similar to Figure 1, showing the parts as they appear when the standard commercial refrigerating unit is removed.

It is particularly to be noted that the housing 17 for the fruit syrup jars 18 is so constructed as to overhang unit 10 and to cover one of the holes which leads to a receptacle 13 therein. This arrangement is clearly illustrated in Figures 1 to 4 inclusive. The overhanging portion of housing 17 provides means in accordance with this invention for concealing pipes, whereby heat from the fruit and milk compartments and the like in the special installation is transferred to the brine in vat 12, from which it can be disposed of by the artificial refrigerating mechanism housed in casing 11.

An electric motor 25 is controlled by a switch housed in casing 26. The switch is actuated by any desired type of thermostat 27, the thermostat being preferably located within chamber 15 so that the motor 25 is adapted to be set in operation when the temperature in chamber 15 rises above a given point for which the thermostat is set. Conversely, the thermostat will open switch 26 to stop the motor 25 when the temperature in chamber 15 falls below a predetermined point.

The motor drives a centrifugal pump 30, the inlet pipe 31 of which extends through housing 17 immediately beneath jars 18 therein and thence projects downwardly at 32 to a position where it is received into the receptacle 13 which underlies the overhanging portion of casing 17. The outlet of pump 30 communicates with a discharge pipe 34 which leads into chamber 15 to a series of coils 35 in the bottom of the rear portion of such chamber. If desired, the chamber may be divided into two parts by a low partition wall 36, and a connecting pipe 37 may straddle such wall and lead to a series of coils 38 on the front side thereof. I prefer to fill the rear portion of chamber 15 with brine to the level permitted by partition wall 36, and in this brine I locate one or more cylinders 39 which communicate with pipes 40 which supply carbonated water and with pipes 41 through which the carbonated water passes from the cylinders 39 to the dispensing faucets 16. I use the front portion of chamber 15 as a dry storage cabinet into which jars 44 depend. The lower portion of the cabinet is made accessible by a removable cover 45 and may contain milk, cream, and any other bottled goods for which refrigerated storage is required.

From the coils 38 pipe 46 leads to the back of chamber 15 and thence passes upwardly out of such chamber into the housing 17 to a point whence it can discharge back into the receptacle 13 which is overhung by such housing.

The receptacle 13 which is intended in the normal use of the refrigerating unit 10 to be filled with ice cream or the like is, for the purposes of this invention, filled with brine or a similar liquid which may be acted upon by the centrifugal pump 30 and which will not freeze within the range of temperatures employed. Pump 30 is adapted to circulate brine from the aforesaid receptacle 13 through the interior of housing 17 and chamber 15, and thereby the fruit syrups, bottled goods, and carbonated water are kept refrigerated to the required degree with very little expense and with the loss in capacity of but a single hole in the refrigerating unit 10.

The motor 25 and pump 30 may be placed in any desired position, but I prefer to locate them as indicated, behind the drain board of sink 20 and beneath the cover 48 which is readily removable to afford access to the motor. With this disposition of the parts the entire apparatus may conveniently be assembled, but I wish to make it clear that the general arrangement herein disclosed is adapted for use in practically any type of soda fountain, and the specific details of the present device may be changed without affecting the successful operation of the device.

The fact that housing 17 overhangs the standard refrigerating unit and covers the rear hole in one corner thereof provides a convenient way for disposing neatly of the pipe which is used for the circulation of brine from the ice cream receptacle 13 through the other compartments to be cooled.

The refrigerating unit 10 ordinarily has its own thermostat, whereby its temperature remains constant, and I have found that the heat introduced into vat 12 by the auxiliary circulation system comprising the subject matter of my invention is but little more than the heat which would be introduced into vat 12 if the brine-filled receptacle 13 were used in the ordinary way for the storage of ice cream.

It is usual to adjust the thermostat which controls the temperature of the iceless refrigerating unit for ice cream in such manner that the temperature of such cabinet is maintained considerably below the freezing point of water. Such low temperatures, on the other hand, are not desired for the refrigeration of bottled goods and for the refrigeration of the fruit syrups and carbonated water. It is, therefore, a convenience to have a secondary refrigerating system in heat transferring relation to the system of the commercial unit and provided with its own thermostat, whereby its temperatures may be maintained at a temperature above that of the unit itself.

I claim:

1. In a device of the character described, the combination with a primary refrigerated chamber adapted to receive food containers, of a secondary refrigerated chamber also adapted to receive food containers and provided with circulation ducts extending into the primary chamber, said ducts being adapted for the circulation of a refrigerating fluid from the secondary chamber through a portion of the primary chamber independently of the refrigerating medium in the latter, the capacity of said circulation ducts being such as to obtain a moderate refrigeration of the secondary chamber as compared with that of the primary chamber.

2. In a device of the character described, the combination of primary and secondary refrigerating chambers each provided with a heat absorbing fluid, a fluid container in the primary chamber in sealed relation to the refrigerating fluid in said chamber, and a motor for circulating fluid from said container through the secondary chamber to promote a transfer of heat to the container by convection and to the refrigerant in the primary chamber by conduction through the walls of the container.

3. In a device of the character described, the combination with a refrigerator cabinet having upwardly opening chambers adapted to receive ice cream and the like, of a secondary refrigerating system including passages for liquid refrigerant leading to and from one of said chambers in liquid tight relation to other portions of said cabinet.

4. In a device of the character described, the combination with a refrigerator cabinet having upwardly opening chambers adapted to receive ice cream and the like, of a secondary refrigerating system including one of said chambers and mechanically independent of said cabinet, said secondary system comprising a circulatory duct for fluid having one of its ends extending into the chamber included in said secondary system, and means for the artificial circulation of fluid in said duct.

5. In a device of the character described, the combination with a refrigerator cabinet having upwardly opening chambers adapted to receive ice cream and the like, of a secondary refrigerating system including one of said chambers and otherwise substantially independent of said cabinet, said system comprising a circulatory duct for fluid having one of its ends extending into said chamber, and means for the artificial circulation of fluid in said duct, together with a compartment in heat transferring relation to said duct and a thermostat in said compartment controlling said circulation means independently of temperature conditions in said cabinet.

6. A soda fountain comprising a mechanically refrigerated ice cream cabinet having upwardly opening chambers to receive ice cream and the like, together with a compartment for the storage of supplies other than ice cream, a pipe extending through said compartment and into one of said chambers, said chamber being adapted to be filled with a liquid, and means whereby such liquid may circulate through said pipe to receive heat from said compartment and deliver it to the chamber with which said pipe is connected.

7. In a device of the character described, the combination with a mechanically refrigerated cabinet unit provided with upwardly opening compartment for the storage of ice cream and the like, of a secondary unit comprising a compartment for the refrigeration of fountain supplies other than ice cream, a housing connected with said secondary unit and overhanging one of the chambers of said first mentioned unit, and a system of fluid containing ducts adapted for heat transfer from said compartment to said last mentioned chamber and including a pipe extending from the interior of said chamber into said compartment and a return duct leading to the interior of said housing.

8. In a device of the character described, the combination with a cabinet adapted to contain a refrigerating liquid and provided with upwardly opening storage compartments having liquid tight lower portions within the liquid containing portions of the cabinet, of a secondary storage chamber, a liquid container, a pump having pipe connections leading to and from said liquid container for circulating a different liquid through portions of the secondary storage chamber and portions of said cabinet, a temperature controlled motor responsive to temperature conditions in the secondary chamber for operating the pump, and whereby the pumped liquid may be circulated intermittently under varying temperature conditions in the secondary chamber for transfer of heat to the primary chamber.

9. In a device of the character described, the combination with a cabinet adapted to contain a refrigerating liquid and provided with upwardly opening storage compartments having liquid tight lower portions within the liquid containing portions of the cabinet, of a secondary storage chamber, a liquid container, a pump having pipe connections leading to and from said liquid container for circulating a different liquid through portions of the secondary storage chamber and portions of said cabinet, a motor for operating the pump, and a thermostat in said secondary chamber in controlling relation to the motor, whereby the pumped liquid may be circulated intermittently under varying temperature conditions in the secondary chamber for transfer of heat to the primary chamber, said secondary chamber having a portion overhanging one of the compartments in said cabinet, and through which the suction pipe of the pump extends; and a storage chamber through which the delivery pipe extends from the pump to said container, whereby the secondary chamber and the storage chamber may be refrigerated in proportion to the number of heat units transferred by conduction through the walls of said pipes to the circulating liquid and the rapidity of such heat absorption varied in proportion to the movement of the circulating liquid.

JOSEPH SMITH.